June 26, 1923.  1,459,828

C. G. HARTLEY

STEERING ATTACHMENT FOR TRACTORS

Filed Aug. 8, 1921   2 Sheets-Sheet 1

C. Glenn Hartley, Inventor,
By
W. G. Burns, Attorney.

June 26, 1923.  1,459,828
C. G. HARTLEY
STEERING ATTACHMENT FOR TRACTORS
Filed Aug. 8, 1921  2 Sheets-Sheet 2
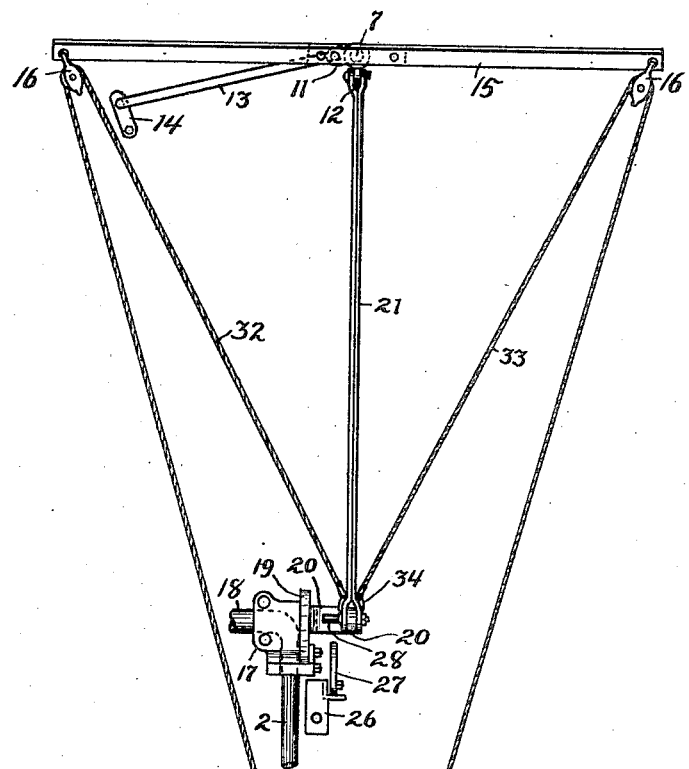
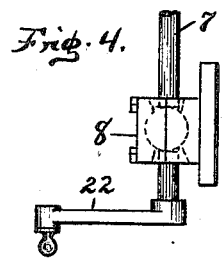
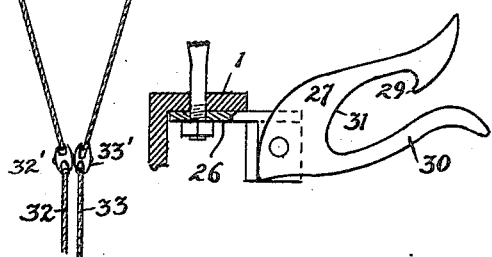
C. Glenn Hartley, Inventor
By
W. G. Burns, Attorney Patented June 26, 1923.

1,459,828

UNITED STATES PATENT OFFICE.

CALVIN GLENN HARTLEY, OF ROANOKE, INDIANA, ASSIGNOR TO KNOX ENGINEERING AND MANUFACTURING COMPANY, A CORPORATION OF INDIANA.

STEERING ATTACHMENT FOR TRACTORS.

Application filed August 8, 1921. Serial No. 490,523.

*To all whom it may concern:*

Be it known that I, CALVIN GLENN HARTLEY, a citizen of the United States of America, and resident of Roanoke, in the county of Huntington and State of Indiana, have invented certain new and useful Improvements in Steering Attachments for Tractors, of which the following is a specification.

This invention relates to improvements in steering attachments for tractors, and the object thereof is to provide apparatus adapted to be attached to tractors of the usual type, and by means of which the movements of the tractor in traveling about may be controlled by manipulating a pair of lines in a manner similar to that in which a horse is usually driven.

This object is accomplished by the construction illustrated in the accompanying drawings, in which:

Fig. 3 is a plan view of the attachment, including a part of the clutch pedal of the tractor;

Fig. 4 is a detail view of the universal bearing support for the steering post; and Fig. 5 is a detail view of the latch for the auxiliary lever for the clutch pedal.

Similar characters of reference indicate corresponding parts throughout the several views, and having reference now to the same:

Figure 1:
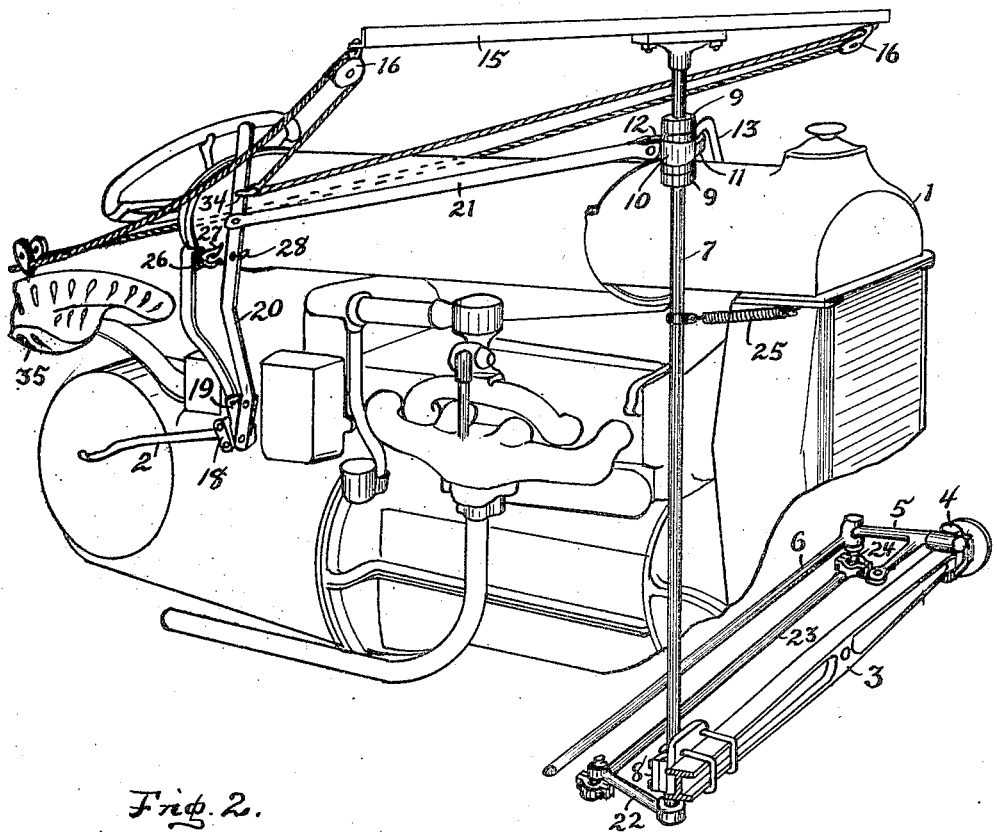
Fig. 1 is a perspective view of the invention applied to a tractor, there being parts thereof broken away and omitted.
Figure 2:
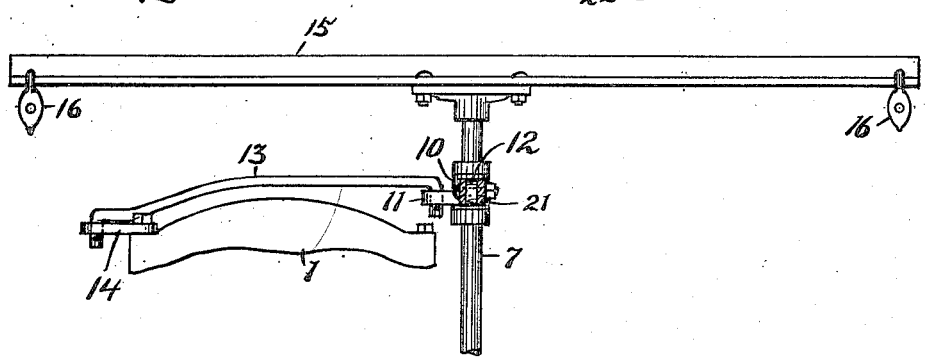
Fig. 2 is a detail view of the steering head of the attachment and the swinging link in connection therewith.

1 is a tractor of well known construction having a clutch pedal 2, and a front axle 3 of the usual type provided at each end with a pivoted spindle member 4 from which projects a steering arm 5. But one of the members is shown in the drawing as the steering structure proper of the tractor is of the common type in which the arms 5 of the spindle members are coupled together by a cross-rod 6 for maintaining parallel relation thereof.

The invention consists of a steering post 7 vertically arranged and receiving support in a universal bearing 8, which may be, for example, of the "ball and socket" type, the bearing being mounted on the axle 3. Near the upper end of the post are fixed a pair of collars 9 spaced apart and holding in place a loose bearing 10 having projecting lugs 11 and 12. A swinging arm 13 is pivotally supported in a bracket 14 that is fixed on the body of the tractor, and the other end of the arm is pivotally connected in the lug 11 of the bearing 10. By this arrangement, the post 7 may be turned upon its axis in the bearings 8 and 10 and be tilted fore and aft in the universal bearing 8 under the guidance of the swinging arm 13.

Upon the top of the steering post 7 is fixed a tiller 15 the ends of which project laterally in opposite directions, there being a pulley 16 attached at each end of the tiller.

A bracket 17 is fixed on the clutch shaft 18 from which the pedal 2 extends, and the bracket has a sector plate 19 with which an auxiliary lever 20 is adjustably connected and which is adapted to actuate the clutch shaft.

The clutch lever 20 and the bearing 10 on the steering post are coupled together by a connecting bar 21 so that as the post is swung to and fro the lever will be actuated and the clutch accordingly thrown "in" or "out."

Upon the lower extremity of the steering post 7 is an arm 22, the outer end of which has operable relation with a connecting rod 23 that is attached at its opposite end to a pendent pin 24 at the junction of the cross-rod 6 and the steering arm 5, so that movement is imparted to the steering arm accordingly as the post 7 is turned upon its axis.

A retracting spring 25 is attached at one of its ends to the post 7 and at its opposite end to the body of the tractor and tends to hold the post in its forward position. At the rear part of the tractor is fixed a bracket 26 upon which is pivoted a latch 27 adapted to engage a pin 28 that projects from the clutch lever 20 when the lever is swung back and the clutch thus thrown "out." The pin is held by the hook 29 so that the lever is held from returning to its forward position. The latch has a trigger 30 spaced apart from and extending beneath the hook. When the lever is moved backwardly so that the pin bears against the throat 31 the latch is turned upwardly upon its pivot so that the hook 29 is raised above the path of the pin so as to permit the pin to move out from engagement with the hook. In passing out of the latch the pin engages the trigger causing the latch to be returned to its normal position in readiness for re-engagement with the pin.

A pair of lines 32 and 33 are each connected at one end to a yoke 34 on the auxiliary lever 20 and are trained respectively through the pulleys 16 at the corresponding opposite ends of the tiller 15 and extend from the pulleys 16 through guide pulleys 32' and 33' respectively which are attached to the tractor at the rear of the seat 35. The lines may be of any suitable length so as to be manipulated from a point remotely in the rear of the tractor.

In the operation of the invention, the tractor engine which is preferably equipped with an automatic governor for the regulation of its speed, such as are commonly employed, is started while the clutch is held out by positioning the lever 20 with its pin 28 engaged by the latch 27. The transmission gear is then set for forward movement of the tractor. The driver then manipulates the lines in the manner ordinarily applied in driving a horse. By simultaneously yanking both lines with equal force, the tiller and the steering post are drawn backwardly causing the clutch lever 20, through the expedient of the connecting bar 21, to swing backwardly so that the pin 28 on the lever throws the latch out of detaining engagement therewith permitting the lever to swing forwardly when the lines are slackened so as to let the clutch "in" which causes the tractor to be set in motion. By pulling on one line and paying out the other line, the tiller is turned, together with the post attached thereto, in one direction or the other accordingly so that steering movement is imparted through the arm 22 on the post and the connecting rod 23 to the steering arm 5, and in this manner the course of the tractor is directed by the driver. By pulling on both lines simultaneously the tiller and the post together with the clutch lever are swung bodily backward so that the pin 28 is returned to engagement with the latch so that the clutch lever is held in the position by which the clutch is held out of engagement, thus bringing the tractor to a stop.

The advantages of the invention are that the driver may easily control the starting, steering and stopping of the tractor while seated on a plow, scraper or other apparatus that is being drawn by the tractor, thus permitting the management of both implements by a single operator.

What I claim is:—

1. In an attachment for a tractor having a steering gear and clutch, an auxiliary steering member including a post and tiller fixed thereon; a universal bearing on the tractor for supporting the post near the lower end thereof, said post having operable relation with the steering gear of the tractor and being adapted to have swinging and turning movement in said bearing; a movable bearing near the upper end of the post having means in connection therewith for guiding the same; an auxiliary lever having fixed relation with the clutch pedal of the tractor; a bar having connection with the movable bearing on the post and the auxiliary lever for imparting movement from the post to said lever; a latch adapted to have locking engagement with the auxiliary lever; and a pair of lines having connection with the auxiliary lever and respective operable relations with the corresponding opposite ends of the tiller.

2. In an attachment for a tractor having a steering gear and clutch mechanism, a steering post having swinging and turning movements and actuating relation with the steering gear and the clutch mechanism; a latch, operable by the swinging movement of the post, adapted to have locking engagement with the clutch mechanism when the clutch is thrown out; and means including a pair of lines having actuating relation with the post and being adapted for selectively imparting swinging and turning movements thereto.

3. In an attachment for a tractor having a steering gear and clutch member, a mechanism including a post having turning and swinging movements and actuating relation with the steering gear operable by its turning movement and having also actuating relation with the clutch member operable by its swinging movement; a latch operable by the swinging movement of the post for engaging the clutch member; and means including a pair of lines having actuating relation with the post adapted to selectively impart thereto turning and swinging movements.

4. In an attachment for a tractor having a steering gear and clutch member, an auxiliary lever in fixed connection with the clutch member having a projecting pin; a latch adapted to have locking engagement with the pin for holding the clutch out; an auxiliary steering mechanism having actuating relation with the steering gear proper and also with the auxiliary lever and being adapted to selectively impart movements thereto; and a pair of lines having actuating relation with the auxiliary steering mechanism.

5. In an attachment for a tractor having a steering gear and clutch member, an auxiliary steering mechanism including a post, having turning and swinging movements, and an auxiliary lever having actuating relation with the clutch member, there being a connection between the post and lever for imparting swinging movement from the former to the latter; a tension means for holding the post in its forward position; a latch adapted to have engaging relation with the lever for holding the same in its rearward position; means in connection with the post operable by the turning movement thereof for actuating the steering gear; means for guiding the swinging movement of the post; a tiller having oppositely extending arms mounted on the post, there being a pulley at the outer end of each arm; and a pair of lines each having fixed connection with the auxiliary lever and extending through the pulley of the corresponding arm, said lines being adapted to selectively impart swinging and turning movements to the post.

In testimony whereof I affix my signature, in presence of two witnesses.

C. GLENN HARTLEY.

Witnesses:
MATILDA METTLER,
WALTER G. BURNS.